United States Patent [19]

Kiss

[11] 4,378,265
[45] Mar. 29, 1983

[54] PROCESS FOR PRODUCING MOLDED PARTS FROM FLAT TANGLED FLEECE MATS

[75] Inventor: Günter H. Kiss, Berlin, Fed. Rep. of Germany

[73] Assignee: Lignotock Verfahrenstechnik GmbH, Fed. Rep. of Germany

[21] Appl. No.: 283,514

[22] Filed: Jul. 15, 1981

[30] Foreign Application Priority Data

Jul. 24, 1980 [DE] Fed. Rep. of Germany ....... 3028242
Sep. 3, 1980 [DE] Fed. Rep. of Germany ....... 3033494

[51] Int. Cl.³ .................... B29B 11/00; B32B 31/20
[52] U.S. Cl. .................... 156/242; 156/245; 264/113; 264/119; 264/120
[58] Field of Search .............. 156/224, 228, 62.6, 156/62.8, 242, 245, 500; 264/112, 113, 119, 120, 123, 257, 258; 425/110, 111, 112, 125, 353, 406, 411, 412, 414, 415, 423, 580, 581, 583.1

[56] References Cited

U.S. PATENT DOCUMENTS

| | | | |
|---|---|---|---|
| 3,423,267 | 1/1969 | Munk | 264/120 |
| 3,504,073 | 3/1970 | Rakszawski | 264/113 |
| 3,825,642 | 7/1974 | Kies | 264/119 |
| 3,898,121 | 8/1975 | Holrod et al. | 156/500 |
| 4,058,580 | 11/1977 | Flanders | 264/113 |
| 4,221,556 | 9/1980 | Kiss | 425/412 |

FOREIGN PATENT DOCUMENTS

2731691 1/1978 Fed. Rep. of Germany .
2338650 10/1978 Fed. Rep. of Germany .

Primary Examiner—Caleb Weston
Attorney, Agent, or Firm—Basile, Weintraub & Hanlon

[57] ABSTRACT

The present invention relates to a process for producing molded parts from flat tangled fiber fleece mats, preferably formed from binder-containing cellulose or lignocellulose fibers, in which the fiber mat is compressed by press tools and is subsequently optionally provided with a decorative surface layer. The compression takes place in two stages of premolding and final molding in successive strokes in a single press without intermediate cooling and the decorative surface layer is supplied to the press after final molding. Between the press tools which are in the open position for the first process stage is introduced a premolding tool used for premolding the fiber mat, for the decorative process stage following the final molding in the open press tool an auxiliary tool is introduced which, with regards to the compression molding pressure, temperature, shaping and/or surface structure, can be matched to the characteristics of the decorative surface. The apparatus for performing the process is an auxiliary and premolding tool which can be inserted and removed by guides and permits a vertical adjustment.

11 Claims, 10 Drawing Figures

PROCESS FOR PRODUCING MOLDED PARTS FROM FLAT TANGLED FLEECE MATS

BACKGROUND OF THE INVENTION

1. Field Of The Invention

The invention relates to a process for producing molded parts from flat tangled fiber fleece mats, preferably formed from binder-containing cellulose or lignocellulose fibers and to an apparatus for performing the process.

2. Description Of The Prior Art

Particular care is necessary when producing molded parts from tangled fiber fleece mats formed from binder-containing cellulose or lignocellulose fibers, because prior to shaping it is necessary to soften and make shapable, e.g., by vapor treatment, the fiber fleeces.

This significantly breaks down the fiber bond brought about by the binder, so that during the shaping process which takes place in the presence of the heat, there is a considerable risk of the fiber bond being broken and consequently in all cases the molded members would constitute waste.

It is known (German Pat. No. 2,338,650) to perform the shaping process in a press where a stepwise shaping takes place through the mold having a plurality of press rams in each case covering a deformation zone with a particular degree of deformation and which, independently of one another and in the sequence of the degrees of deformation, can be transferred from an open position into a pressing position. Apart from the costly construction of the press and the long and costly process, it is necessary to pre-compress the fiber mat at those points where a very considerable final deformation takes place. Therefore, of late, the procedure has been to finally shape the heat-softened fiber mat by press tools which can be moved against one another, initially by premolding and then by final molding. As is known, this is carried out by two separate molds, one of which carries out the premolding and the other the final molding. The fiber mat is removed from a stack and placed on a premold after being softened in a heating station and brought to a temperature adequate for shaping purposes. The premold comprises a press equipped in a known manner with a female mold and a male mold, whose shaping surfaces are designed in such a way that the heated, softened fiber mat can satisfactorily follow the shaping. Following preshaping, the preshaped part must cool in the premold in order to be removed therefrom and be placed in the second press used for final molding. The second press also comprises a male mold and a female mold where the premolded part which has cooled in the meantime must be heated again, so that final molding between the two hot press tools can again be performed on an adequately softened premolded part.

Another process for producing molded parts is known (DOS No.2,615,793) in which between two suitable press tools in a first press stroke a binder-containing fiber mat, e.g., of cellulose, or lignocellulose material, is compressed into a molded part serving as a supporting layer, which is left in the press tool and after introducing a decorative surface layer is permanently joined therewith over its entire surface area in a further press stroke.

This is based on the fact that molded parts of the present type when used as decorative elements, linings and also supporting parts, e.g., for lining vehicle interiors, must undergo surface finishing after producing the actual supporting layer. The problem of the aforementioned prior art is based on supporting layers of laminates, laminated wood, pressed wood fiber materials and and like and is only concerned with the fact that after producing molded articles from these materials, there must be a surface coating with a needled fleece. Such a molded article is produced by initially compressing the supporting layer and after obtaining the corresponding molded article the decorative and visible side thereof is previously coated with a thermally acting adhesive and then the needled fleece is applied. Under substantially constant temperature conditions in the same press a second press stroke follows for which, however, the compression molding pressure is considerably reduced to prevent damage to the needled fleece.

The conditions are similar in a further known process for producing a shaped lining sheet formed from a corrugated paper or board support and in which the covering layer is pressed on by means of a cushion insert which can be introduced into the press (DOS No. 2,731,691).

The pressing on of the needled fleece according to the aforementioned process with the same press tool as used for producing the molded article, i.e., with unchanged contours of the press ram, does not take into account the locally differing tensile and compressive stresses and consequently changes in the overall thickness as is the case with the last-mentioned known process. Thus, only inadequately compressible needled fleeces can be used for the process, whose structure and appearance do not significantly change due to the compression process. However, satisfactory results are not obtained through the known use of a cushion insert in the form of an air cushion, particularly in the case of complicated three-dimensional shapes, e.g., with vertical or sharply bent edges.

The known processes can in particular not be used on those decorative layers unable to withstand high molding temperatures of 150° C. to 200° C. or possibly even higher, whose structure and appearance suffers through the contour of the moved press tool halves and in which the adhesive layer or adhesive used would pass through the layer during pressure application.

The number of stages necessary constitutes a disadvantage of all the known processes. These stages involve the transfer of the individual fiber mats to a heating station, the manual removal of the heated fiber mats from the heating device and the introduction thereof into the premold, the performance of the premolding process, the cooling of the premolded part to a transportable solidified state, the removal from the premold and the introduction into the final mold and the separate performance of the final molding of the intermediate produce, whilst applying the decorative layer. The requisite large number of process stages leads to high labor costs and particularly is very time-consuming. Another disadvantage is that the fibrous material must be heated a number of times, which disadvantageously influences the characteristics of the binder.

The problem of the invention is to eliminate the disadvantage of the prior art and to provide a process and apparatus such that, whilst significantly reducing the necessary number of process stages, the premolding and final molding can take place in the same heat, i.e., without any intermediate cooling of the tangled fiber fleece mat. In addition, it permits the application of decorative surface layers from substantially random materials, even in the case of the most complicated shapes.

This problem is solved by a process according to the preamble of the main claim by means of features given in characterizing part thereof. The subclaims relate to advantageous further developments of the invention.

SUMMARY OF THE INVENTION

According to the invention, the presses hitherto required for premolding and the application of the decorative surface layer become superfluous, because the heated fiber mat is pemolded, finally molded and optionally surface-finished in the press used for final molding purposes. The term "press tool" is understood to mean a tool half, i.e., the famale mold and the male mold of the press. The premold and auxiliary tools are introduced between the press tools for premolding and final molding with surface finishing. It is advantageous to use a press tool for premolding and surface coating, so that in the process of the invention a total of only three tools are required and not, as in the prior art, a larger number thereof. One or more intermediate cooling processes for the fiber mat or an intermediate product with all the disadvantages linked therewith are no longer necessary.

The process of the invention offers the following advantages:
(1) reduction of the necessary number of process stages,
(2) reduction of the number of tools required,
(3) reduction of energy requirements and cycle times,
(4) better quality of the end product and considerable reduction of waste.
(5) better utilization of thermoplastic and/or duroplastic binder proportions in the tangled fiber fleece, because the time between premolding and final molding is reduced, so that quality-reducing precondensation of the binders is reduced and there is also a better utilization of the adhesive between the molded part and the decorative surface.

It is particularly advantageous to use a support which can be moved into and out of the mold and which contains the premolding tool, the cold fiber mat and a heating element, so that during the introduction of the support into the press the necessary heating of the mat can take place. The support remains in the inserted position, because with respect to the support the premolding tool is lowerable for premolding purposes and places the heated blank received onto the lower press tool, so that immediately after moving out the support, the lower tool, acting as the male mold, can engage with the upper press tool for final molding purposes. The same applies regarding the application of the decorative surface layer.

In the present process, no requirements are made on the decorative surface layer material, because the auxiliary tool can be adjusted as a function of the optimum compression molding pressure for each material, the requisite temperature, the thickness of the decorative layer and the like. In the same way, the adhesive between the decorative surface layer and the molded article can be matched in an optimum manner to the support formed from cellulose or lignocellulose materials and the binders admixed therewith, as well as the decorative layers, without it being necessary to take account of the particularly high molding temperatures. Decorative layers of a particularly sensitive nature regarding mechanical or thermal stressing hitherto had to be manually stuck to the supporting layers, which is now completely unnecessary. Changes to the overall thickness of the molded part and/or the decorative surface can be balanced out without significant expenditure by a special construction of the auxiliary tool, which improves the surface quality. Importance is no longer attached to the compressibility, tensile strength, pressure or temperature sensitivity of the decorative surface layer to be applied to the whole surface area and permanently joined to the supporting layer.

Resin contamination or the like to the auxiliary tool, as well as to other parts of the press tool by the adhesive coatings used are reliably avoided, because they only come into direct contact with the decorative surface layer.

As the forces required for adhesion are frequently lower than those required for compressing the supporting layer, the auxiliary tool can optionally be made from lower strength materials such as aluminum, plastic or the like. This reduces the performance costs of the process and speeds up working with the auxiliary tool. The use of lower strength materials for the auxiliary tool is also made easier by the fact that it is subject to less thermal stressing than the press tools of the support part.

Molded articles and supporting layers are generally molded with finished contours. This is generally brought about with the aid of squeezing or dipping edges. If the edge contour of the auxiliary tool is constructed as a squeezing edge adapted to that of the press tool, it is in particular possible also to cut thermoplastic decorative layers giving finished parts which do not have to undergo any secondary treatment.

BRIEF DESCRIPTION OF THE DRAWING

The invention is described in greater detail hereinafter by means of exemplified embodiments and with reference to the drawings, wherein show.

DESCRIPTION OF THE PREFERRED EMBODIMENTS

Figure 1:
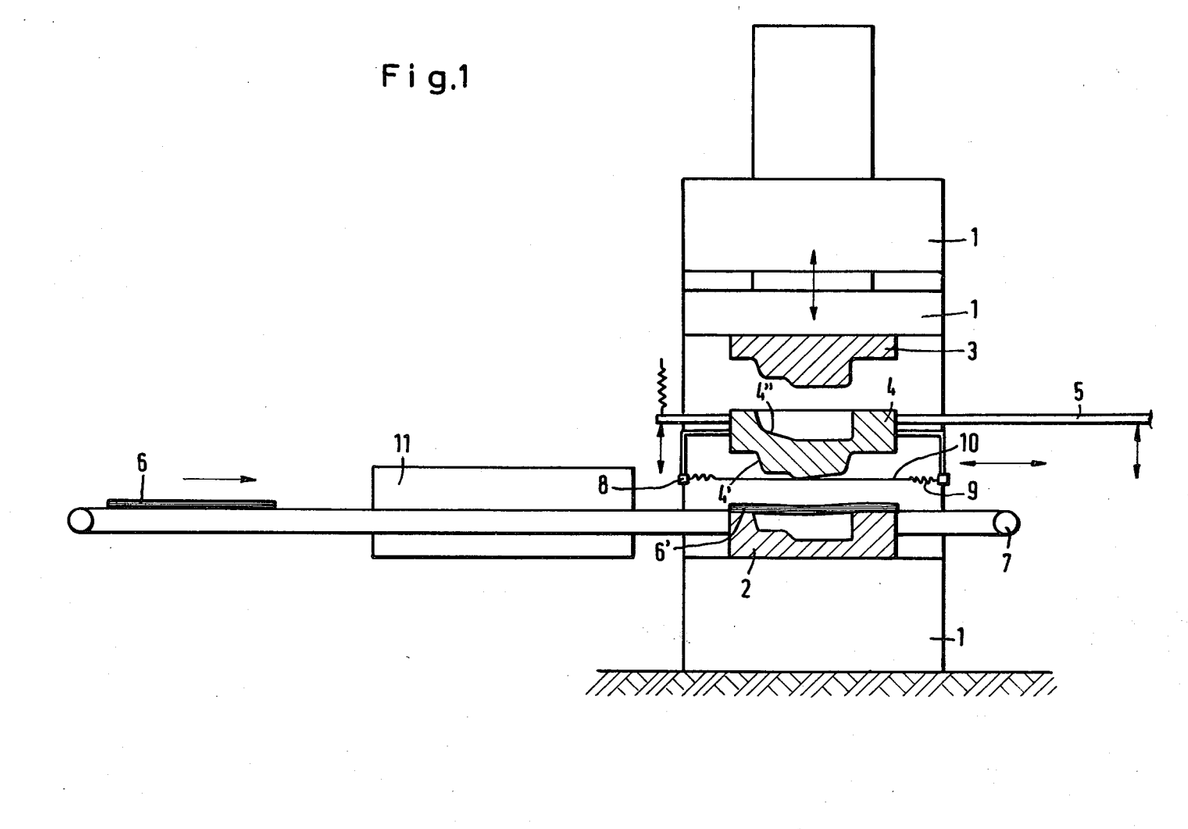
FIG. 1 is a diagrammatic view of the apparatus in the extended position.
Figure 2:
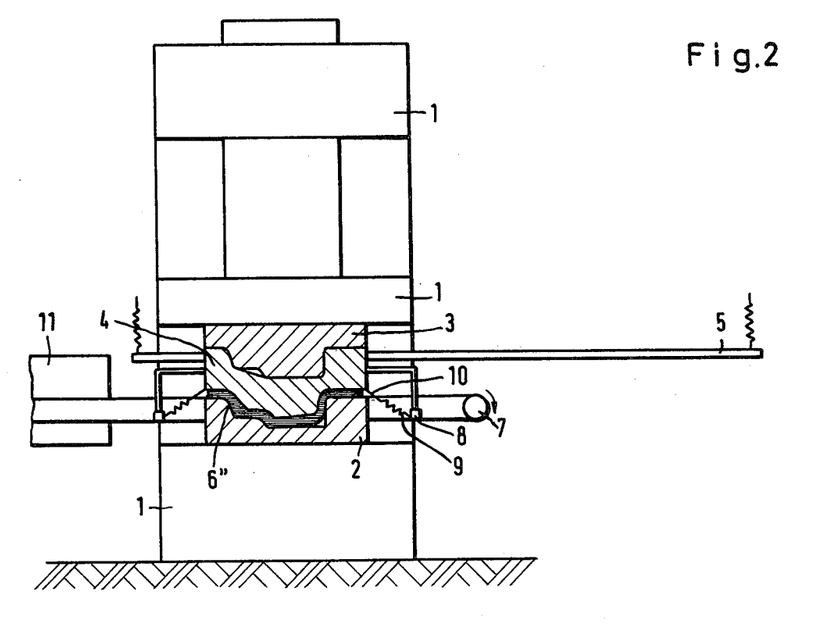
FIG. 2 is a view corresponding to FIG. 1 in the premolding position.
Figure 3:
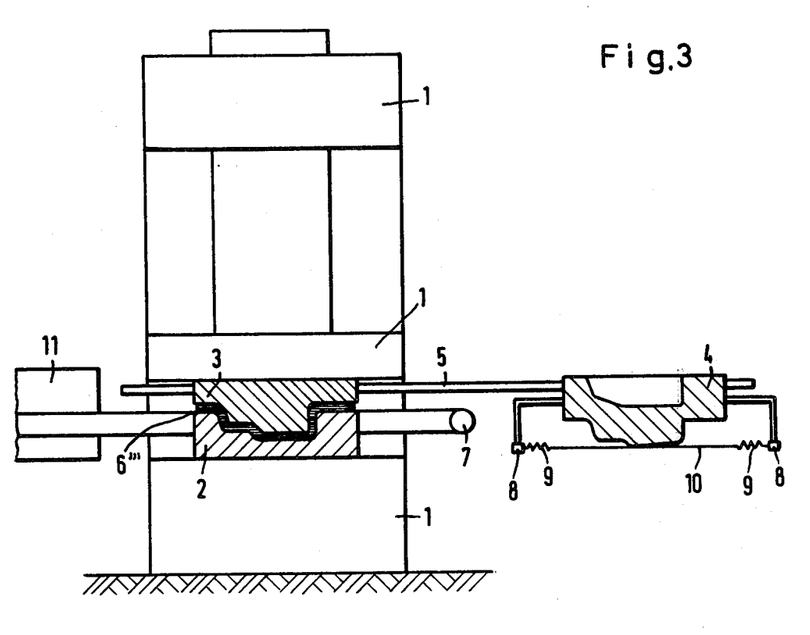
FIG. 3 is a view corresponding to FIG. 1 in the final molding position.

As can be seen in FIGS. 1 to 3, the apparatus comprises a vertically arranged press 1, having an upper press tool 3. The upper press tool 3 can be moved up and down by the upper plunger of press 1.

Press 1 is shown in the open position with a premolding tool 4 having a lower shaping surface 4' used for premolding the heated blank 6' and which is softer than the shaping surface of press tool 3 of press 1 inserted therein. The premolding tool 4 is arranged on horizontal rails 5 which are vertically adjustable in the manner shown by the arrows for the engagement of tool 4 with the heated fiber mat 6 forming blank 6'.

On its side facing the shaping surface 4' premolding tool 4 has a recess 4" in which engages press tool 3 of press 1 during its downward movement and keeps tool 4 centered with respect to press tool 2 of press 1. During the downward movement of press tool 3, the premolding tool 4 is also moved downward, accompanied by a vertical adjustment of rails 5 and comes into pressure engagement with the heated blank 6' for forming premolding parts 6". Press tool 3 of press 1 is then moved upwards and simultaneously rails 5 are moved upwards with the premolding tool 4, so that the latter can pass out of the press. Then and in the manner shown in FIG. 3, press tool 3 of press 1 is again moved downward until pressure engagement takes place with the lower press tool 2, so that premolded part 6" is molded to give the final or finished molded part 6"'.

Below premolding tool 4 are provided resilient fastenings 8 and 9 for a foil-like fabric 10 or the like, which is shaped with the premolding tool 4 during the lowering of the latter and serves as a detachable intermediate layer between tool 4 and heated blank 6'.

The apparatus functions in the following way. As shown in FIG. 1 a cold fiber mat 6 is placed on a conveyor belt 7, e.g., a chain conveyor positioned laterally of press tool 2 of press 1 and is passed through a continuous-type furnace 11 in which blank 6" is heated. The heated blank 6' is removed from conveyor belt 7 and placed on the lower press tool 2 of press 1. Press tool 3 of press 1 is now lowered and, accompanied by the lowering of rails 5, brings the shaping suface 4' of premolding tool 4 into engagement with the heated blank 6' via foil 10 and thus produces the premolded part 6" according to FIG. 2. Press tool 3 of press 1, followed by premolding tool 4 is moved upwards, accompanied by rails 5 and the tool 4 is moved out of the press with the resilient fastenings 8, 9 and the foil or fabric layer 10. According to FIG. 3, press tool 3 of press 1 is again lowered and comes into pressure engagement with the premolded part 6" and shapes it between press tools 3, 2 of press 1 to give the final molded part 6"', which is then removed from press 1.

Figure 4:
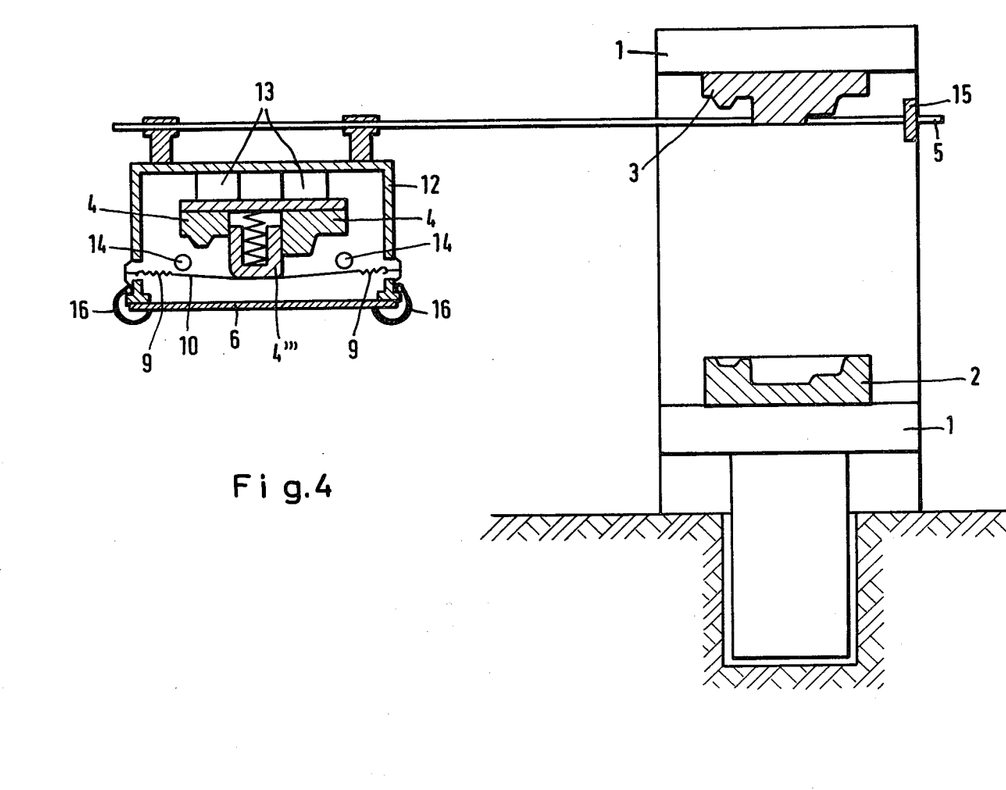
FIG. 4 is a diagrammatic view of a modified apparatus with an extendable support for the premolding tool in the extended position.

FIG. 4 shows the construction of a further advantageous apparatus for performing the process of the invention. Press 1 is constructed as an upstroke press. Press tool 2 is vertically movable whilst the corresponding press tool 3 is located in a fixed manner in press 1.

The box-like support part 12 contains the premolding tool 4, which can be moved vertically up and down with the aid of the hydraulically or pneumatically operating lifting cylinder 13. The shaping surface of premolding tool 4 has a separately positioned partial surface 4"'. As in the case of the apparatus shown in FIGS. 1 to 3, below premolding tool 4 there is a foil or fabric layer 10 elastically fixed to the box-like support part 12 with the aid of resilient fastenings 9. The still cold tangled fiber fleece mat downwardly terminates the box-like support part 12 and is fixed in this position by holding elements 16. Intakes 14 are provided for a heating gas, e.g., superheated steam. Alternatively or additionally the box-like support part 12 can also be equipped with another heater, e.g., radiant heaters.

The box-like support part 12 and the components connected therewith are horizontally movable with the aid of horizontal rails 5, fixed with respect to press 1 and located laterally of press tool 3.

The box-like support part 12 can be positioned within the press with the aid of a stop member 15. FIG. 4 shows the initial position of the apparatus.

With support part 12 extended, the tangled fiber fleece is taken over by means of a not shown stacking mechanism and is fixed by holding elements 16. During the introduction of support part 12 into the open press 1, the tangled fiber fleece mat is heated and is made readily shapable.

Figure 5:
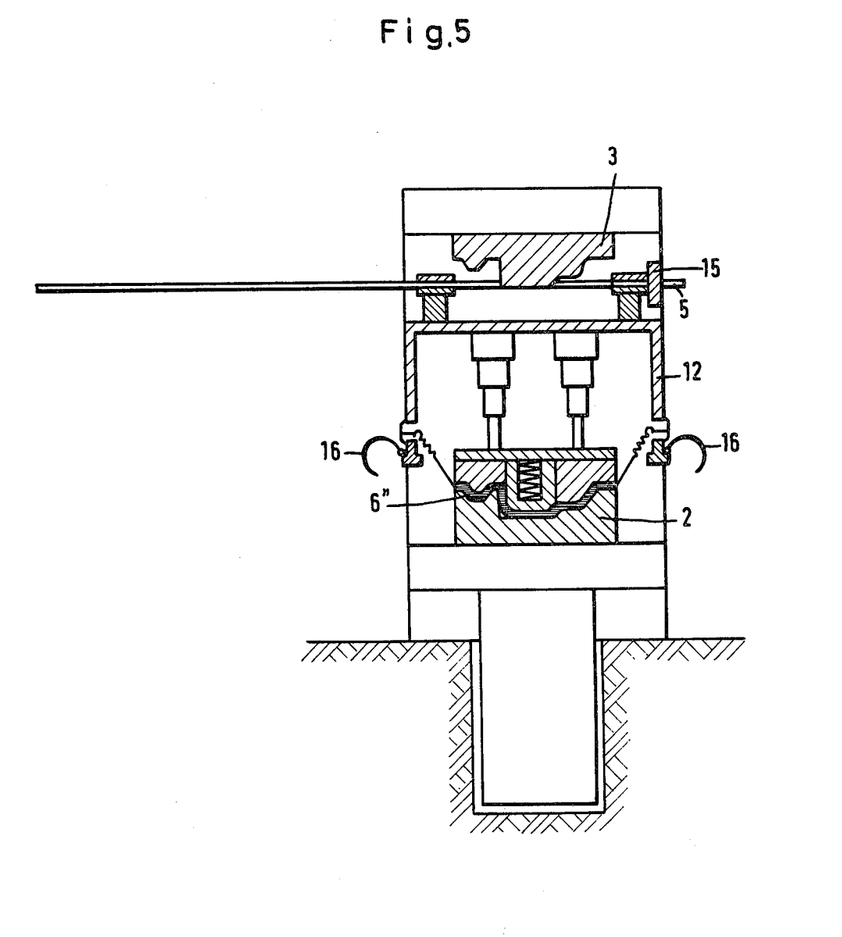
FIG. 5 is a view according to FIG. 4 in the premolding position.

FIG. 5 shows the apparatus at the end of premolding.

By opening holding elements 16 after positioning support part 12, the heated tangled fiber fleece mat is placed on the lower press tool 2 in press 1. Lifting cylinders 13 then move the premolding tool 4 downwards and the mat is converted into the premolded part 6".

Figure 6:
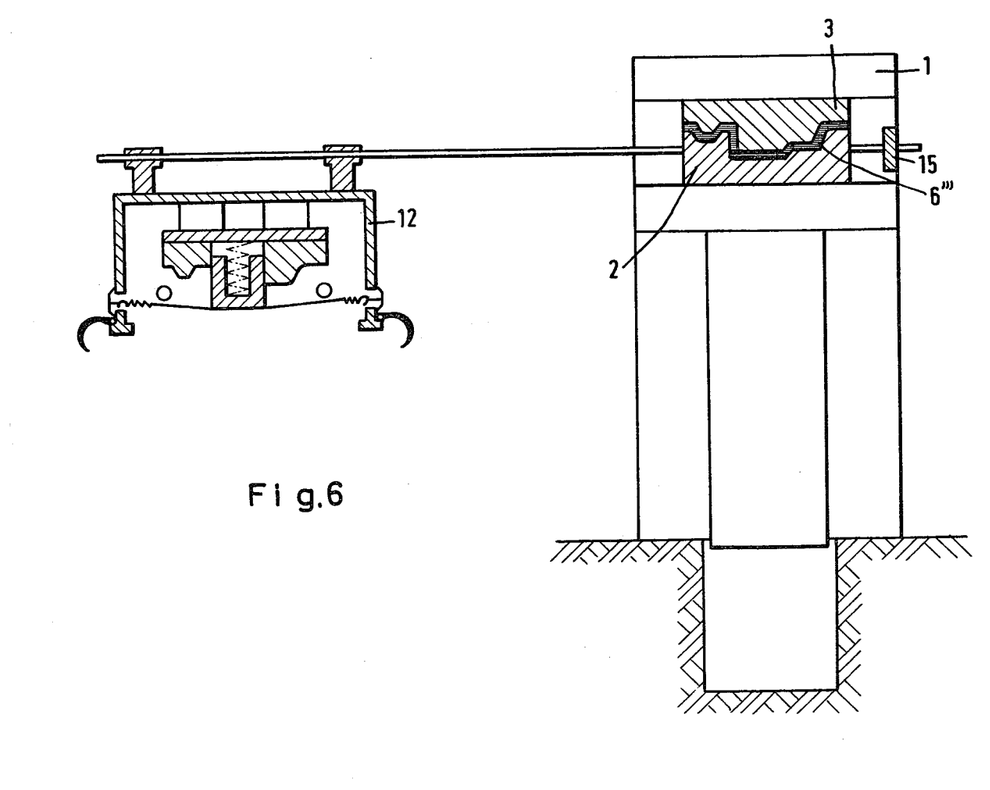
FIG. 6 is a view according to FIG. 4 in the final molding position.

FIG. 6 finally shows the end of the fiber holding process. After lifting cylinders 13 have returned the premolding tool 4 into the initial position according to FIG. 4 with the support part 12, it is moved out of press 1 and is again provided with a tangled fiber fleece mat. During this time, final molding takes place in the heated press tools 2, 3. FIG. 6 shows the position of the individual components of the apparatus at the end of final molding.

The up-stroke press is then opened, the finished part removed and the production cycle is at an end.

The apparatus described relative to FIGS. 4 to 6 permits an advantageous further development, which is not shown for reasons of clarity.

If it is ensured that the finished part adheres to press tool 3 by suitable shaping of the latter, e.g., by local undercuts on the tool 3 by suitable shaping of the latter, e.g., by local undercuts on the tool edge then with the aid of ejectors, claws or similar aids it can be placed on support part 12 during the premolding of a following blank and after premolding can be transported therewith out of the press for automatic stacking.

For the purpose of carrying out premolding it can be advantageous for the premolding tool 4 to have a temperature different from that of press tools 2 and 3. If premolding tool 4 has a higher temperature it can ensure an additional thorough heating of the tangled fiber fleece mats and consequently a reduction of the cycle time. However, lower temperatures may be advantageous for reducing a tendency of the not completely compressed premolded part to stick to the premolding tool, particularly if premolding is to take place without a foil or fabric intermediate layer.

Figure 7:
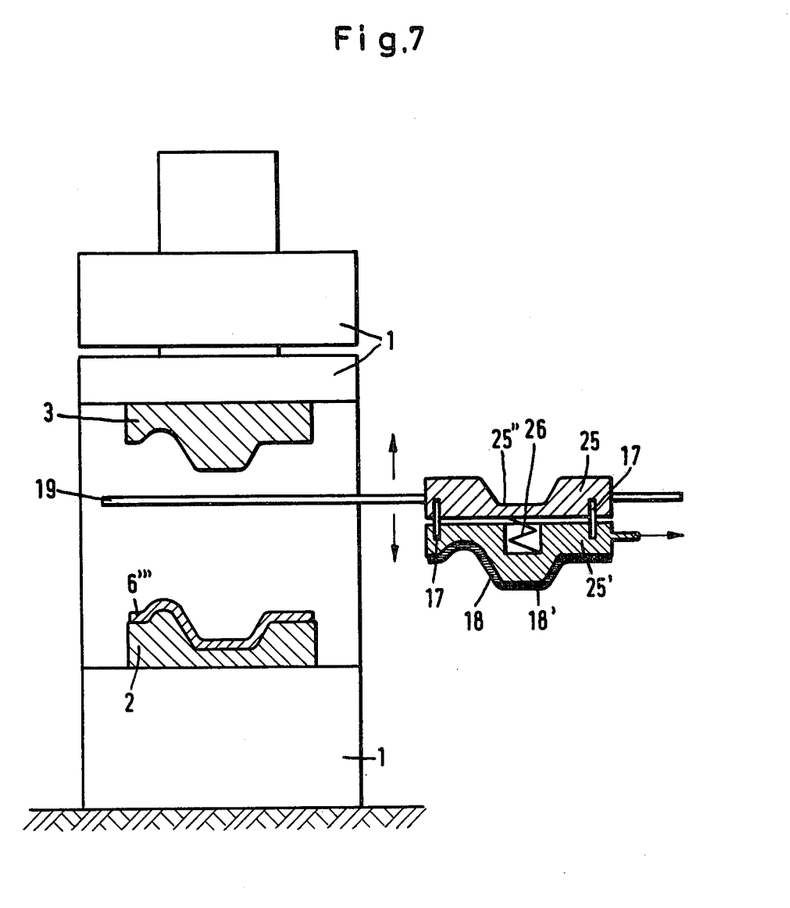
FIG. 7 is a diagrammatic view according to FIG. 1 for performing the process for applying the decorative layer with the press tool open and the auxiliary tool extended.

FIG. 7 illustrates the state of the process for producing molded parts after producing the finished molded part 6" and after opening press 1 by raising the upper movable press tool 3 and before introducing into press 1 the auxiliary tool 25, 25'. The horizontal guide rails 19, corresponding to horizontal rails 5 in FIG. 1 and which do not impede the movement of the upper press tool 3, form a guide for auxiliary tool 25, 25' which from the extended position shown in FIG. 7 after the first working stroke and after opening press 1 is introduced into the latter and is aligned between the upper movable press tool 3 and the lower fixed press tool 2.

The auxiliary tool 25, 25' comprises a guide member 25 mounted on the horizontal guide rails 19 and a mold punch 25' mounted on the horizontal guide rails 19 and a mold punch 25' which, in the following press stroke, assumes the function of the upper movable press tool of press 1 of the preceding stroke. In addition to an alignment of auxiliary tool 25, 25' with respect to the press tools 2 and 3, e.g., by means of light barrier switches, it is possible in the indicated manner to bring about a precise adjustment by means of the surface shape of guide rod member 25, which in the inserted position of the auxiliary tool is in the vicinity of the pressing surface of press tool 3. This is brought about in much the same way as with the premolding tool, e.g., at least the inclined surface areas are so matched to one another that on engagement through lowering press tool 3 onto adjusting surface 25" of guide member 25, they adjust the latter in a substantially tolerance-free manner.

Between guide member 25 and mold punch 25', which is responsible for pressing and permanently joining the decorative surface layer 18 to the molded part 6''' forming the supporting layer, there are preferably a plurality of guidance elements 17 which, in the inoperative position, maintain guide member 25 spaced from mold punch 25'. For this purpose, the two aforementioned members are pretensioned by means of a spring 26, whilst the latter can be replaced by a hydraulic or pneumatic buffer variably controllable with respect to the pressurizing action.

Figure 8:
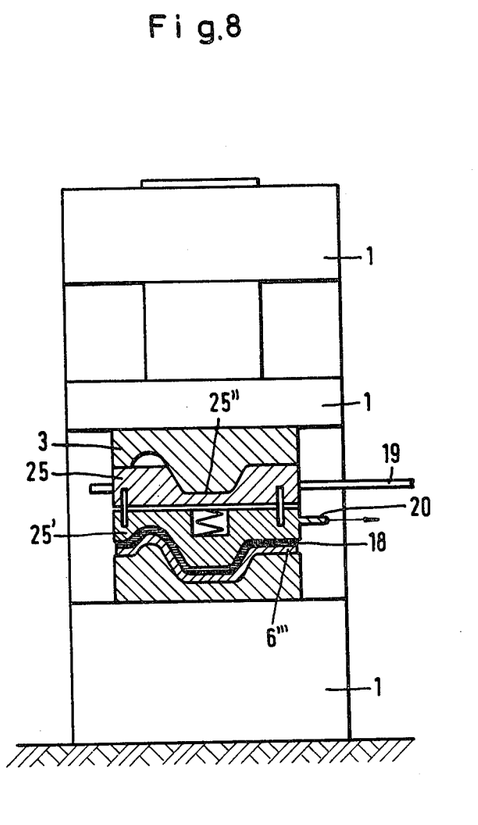
FIG. 8 is a view according to FIG. 2 with an inserted auxiliary tool in the pressing position.

In the inserted state of auxiliary tool 25, 25' shown in FIG. 8 and after lowering the upper, movable press tool 3 to a predeterminable level after engaging the shaping surface of press tool 3 in adjusting surface 25", the only compression molding pressure acting during the press stroke is the pressure on the decorative surface layer 18 and the finished molded part 6''', which is predetermined and adjustable by means of spring 26 or any similar buffer member. An adhesive layer 18', FIG. 7, of a suitable adhesive is applied beforehand between layer 18 and part 6'''. The adhesive layer 18' can either be applied in the form of a foil which acquires adhesive properties through thermal action to the surface of the finished molded part 6''' or to the corresponding facing surface of the decorative surface layer 18, or it can have been applied to the latter together with the production thereof.

The outline of mold punch 25' auxiliary tool 25, 25', together with that of the guide member 25 takes account of the characteristics of the decorative surface layer 18 to be applied to the finished molded part 6''', e.g., by corresponding shape change the thickness of the decorative layer and possibly desired fluctuations therein, the material and the strength of the decorative surface layer 18 and the like. The force acting beguide member 25 and mold punch 25' can be adjusted in an optimum manner for this, as can the lowering position of press tool 3 for the represented press stroke. Along its contour-giving surface, mold punch 25' is preferably made from an air-permeable material, so that air can be sucked in by means of a pipe union 20 connected to its inner cavity, which not only holds the decorative surface layer 18 onto said surface during the introduction of auxiliary tool 25, 25' into press 1, but simultaneously harmonically follows onto its contour prior to the press stroke. When using thermoplastic decorative surface layers and suitable heat action of mold punch 25' through incorporated heating elements a type of deep drawing process can be performed by means of the suction process via the pipe union 20 before connection by adhesion to molded part 6''' in press 1 and this can considerably speed up the work cycle of press 1.

As soon as a firm and permanent connection has been produced between decorative surface layer 18 and the molded part 6''' serving as the supporting layer, in the press stroke represented in FIG. 8 while utilizing the residual heat of press tool 2, as well as that of the finished molded part 6''' and optionally the additional heating and/or cooling of mold punch 25', press 1 is again brought into the open position shown in FIGS. 1 or 7 and auxiliary tool 25, 25' is extended. Simultaneously when this extension process or immediately thereafter the finished molded part provided with the decorative surface layer can be removed from press 1. Thus, press 1 is ready for a new working cycle without there being any residues of the adhesive or the adhesive layer 18' on press tools 2, 3, even after prolonged operation of press 1.

Figure 9:
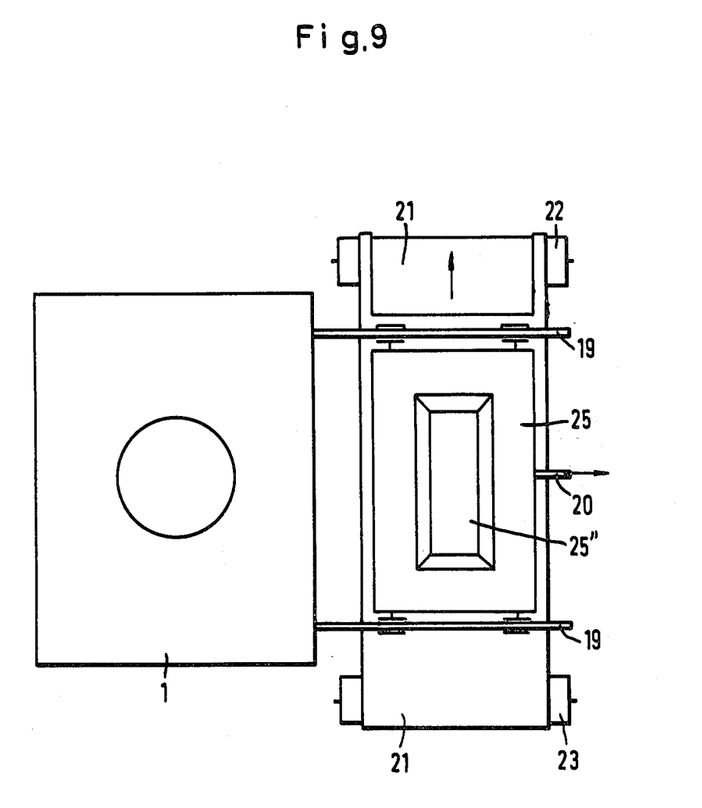
FIG. 9 is a plan view of the apparatus of FIG. 7.

FIG. 9 is a plan view of press 1 of FIG. 7 and, as in the latter, is depicted in cross-sectional form with an extended auxiliary tool 25, 25'. It is particularly easy to see the adjusting surface 25" and a conveying mechanism for a decorative surface layer 18 in the form of an endless belt which is connected to auxiliary tool 25, 25'. By means of the reels 22, 23 on either side of the auxiliary tool the belt is unwound in the represented manner on one side and, with regards to the punched out residues, it is wound up on the other side again. An endless belt 21 is intermittently moved by the reels 22, 23 which, together with auxiliary tool 25, 25' are introduced into press 1 for the described press stroke, remain stationary during said stroke and after applying the decorative surface layer 18 are further wound up in each case the length of an active punching surface. Reels 22, 23 which are appropriately provided on auxiliary tool 25, 25' for the case when the decorative layer 18 is in the form of an endless belt can be replaced by providing stacking devices for blanks of decorative surface layers on one or both sides of auxiliary tool 25, 25'. In the latter case, the uppermost layer of a stack can be introduced into press 1 by means of suction devices held by mold punch 25'.

Figure 10:
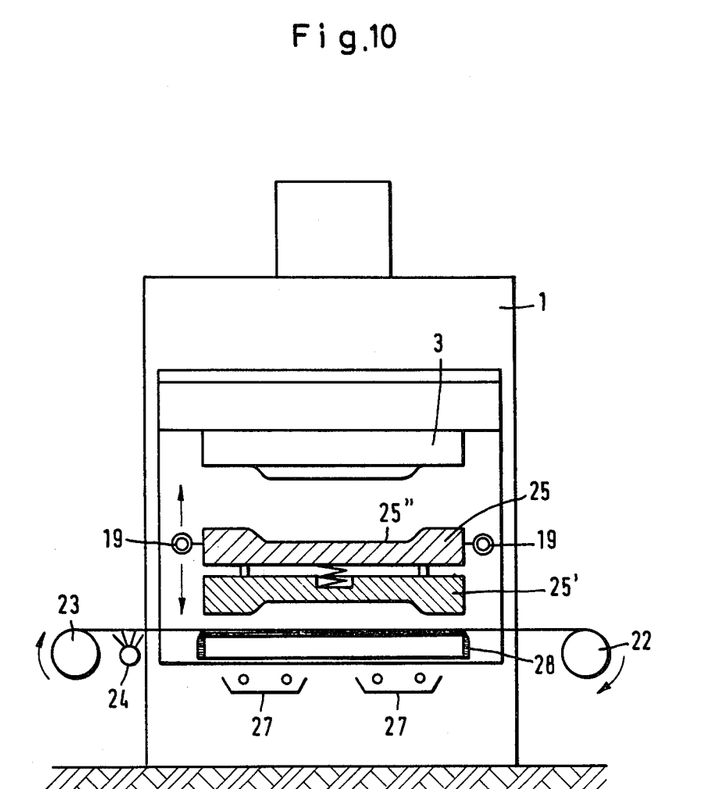
FIG. 10 is a longitudinal section in the direction of the supply mechanism for the decorative surface layer.

FIG. 10 shows reels 22, 23 with endless belt 21 in a diagrammatic longitudinal section. It is also possible to see further components located under the decorative layer in the form of endless belt 21 and which are not shown in the diagrammatic plan view.

A sprayer 24 during the movement of endless belt 21 coats its underside with a hot-melt adhesive. By means of radiant heaters 27, preferably infrared heaters, the thermoplastic decorative layer is heated and made deep-drawable in the vicinity of the auxiliary tools. The heat sources simultaneously activate the adhesive layer. After the decorative layer has been sucked in a contoured manner onto mold punch 25', auxiliary tool 25, 25' is moved downwards and the decorative layer is cut by means of a revolving punch knife 28. The auxiliary tool 25, 25' then moves back into the initial position shown in FIG. 1.

In the case of the embodiment of FIGS. 7 to 10, the finished molded part 6''' remains in the lower press tool 2. As a function of the shape of the desired finished part, it can however be advantageous to leave the finished molded part in the upper press tool 3, which can be brought about by means of suitable auxiliary devices, e.g., undercut areas on the edge of the supporting layer. It will be necessary in this case for the auxiliary tool to be installed rotated in the vertical direction.

The aforementioned arrangement can be particularly advantageous if the decorative layer is not used as an endless belt in the form of foils, carpet fabric or fleeces and is instead constituted by a liquid film which is sprayed onto the contoured surface of the auxiliary tool. An apparatus arrangement in which the contoured surface of the auxiliary tool is positioned horizontally at the top facilitates the spraying of a thermosetting liquid film. It is also possible to use in the same way other thermosetting varnish dispersions, water-dispersed varnishes being particularly advantageous.

As the introduction time of the auxiliary tool into the press can be kept short, it is possible with the same procedure to coat the contour side of the auxiliary tool with a liquid integral foam which, due to the residual heat of the support part, rapidly expands after auxiliary tool is inserted and the press closed. It is also possible with the present apparatus to combine the use of a prefabricated foil with a corresponding liquid foam or to combine a liquid film with a corresponding liquid foam. As the auxiliary tool can have a random outline, it is possible when using foams to foam more thickly individual portions of the supporting layer and consequently obtain correspondingly desired cushioning points.

The process stages described and represented relative to FIGS. 1 to 10 can be performed in continuous succession with optimum timing. However, it is also conceivable to eliminate the stages of applying a decorative layer which finishes the surface of the molded part (e.g. for lining the inside of lorries).

What is claimed is:

1. A process for producing molded parts from flat tangled fiber fleece mats, preferably formed from binder-containing cellulose or lingocellulose fibers in which the fiber mat, which has been softened and preswollen by heating, is compressed by upper and lower press tools which can be moved against one another comprising the steps of:
    performing premolding and final molding at the same heat in successive strokes in a single press without intermediate cooling of the tangled fiber fleece; and
    introducing a premolding tool used for premolding the fiber mat between the press tools which are in the open position for the first process stage, bringing said premolding tool into and out of pressure engagement with said mat and subsequently moving said premolding tool out of the press, and immediately thereafter bringing the press tools into pressure engagement with one another in a second process stage for the final molding of the premolded part located in the press.

2. The process according to claim 1 further including the steps of:
    placing the fiber mat in a support which fixes the latter and contains the premolding tool and an element for heating the fiber mat;
    introducing the support into the open press while heating the mat and centering the premolding tool with respect to the lower press tool;
    lowering the premolding tool with respect to at least one of the parts of the support into pressure engagement with the lower press tool;
    releasing the fiber mat so as to place it on the lower press tool;
    raising the premolding tool; and
    moving the support out of the open press tool into pressure engagement with the upper press tool.

3. The process according to claim 1 further including the steps of:
    bringing decorative surface into alignment with the molded part after the final molding of the molded part in the open press using an auxiliary tool which, with regards to the compression molding pressure, temperature, shaping and/or structure, can be matched to the characteristics of the decorative surface layer and is movably held in the direction of the press stroke, whereby in a following press stroke it replaces the premolding tool and can be engaged and lowered with one press tool half and joins the decorative surface to the molded part as a supporting layer; and
    removing the auxiliary tool from the open press prior to the removal of the surface finished molded article.

4. The process of claim 3 further including the steps of providing the auxiliary tool movable along horizonatal guide rails with a mold punch, a guide member, guidance elements between the mold punch and the guide member for maintaining the spacing of the guide member and the mold punch and members which are regulatable with respect to their force transfer.

5. The process according to claim 3 further including:
    supplying the decorative surface layer together with an adhesive layer to the auxiliary tool outside the press between the adhesive layer and a supporting layer and is introduced into the press together therewith.

6. The process according to claim 3 further including: supplying the decorative surface layer to the auxiliary tool in the form of an endless belt which is punched out while being kept transportable therein.

7. The process of claim 1 further including the step of providing guides for inserting and removing the premolding tool and permitting a vertical adjustment of the latter.

8. The process according to claim 7 further including the step of providing the premolding tool on its side facing the shaping surface of the press tool on at least part of its area with a negative contour of the tool of the press associated with said side, the vertical and sloping surfaces of the negative contour serving to center the premolding tool in the press.

9. The process according to claim 7 further including the step of resiliently suspending the guides, which are constructed as guide rails, in the lifting direction of press.

10. The process according to claim 7 further including the step of providing the premolding tool with heating and/or cooling means.

11. The process of claim 7 further including the step of constructing an edge contour of the auxiliary tool as a squeezing edge.

* * * * *